3,393,251
RHENIUM CATALYSIS OF THE OLIGOMERIZATION AND REARRANGEMENT OF OLEFINS
Donald M. Fenton, Anaheim, Calif., assignor to Union Oil Company of California, Los Angeles, Calif., a corporation of California
No Drawing. Filed Sept. 28, 1964, Ser. No. 399,850
11 Claims. (Cl. 260—683.15)

ABSTRACT OF THE DISCLOSURE

A hydrocarbon olefin is contacted with a catalyst comprising a rhenium oxide of intermediate valency at a temperature from about 0 to 300° C. in liquid or vapor phase to cause the polymerization of the olefin to oligomers such as dimers, trimers and tetramers.

Description of the invention

This invention relates to a method for the rearrangement and oligomerization of olefins, and in particular, relates to the rearrangement and oligomerization of olefins in the presence of rhenium oxide catalyst.

I have discovered that hydrocarbon olefins having 2 to 30 carbon atoms can be rearranged and polymerized to low molecular weight oligomers by contacting said olefins with rhenium oxide at a temperature of about 0° to 300° C. and a pressure of about $10^{-2}$ to $10^{+3}$ atmospheres.

The products from the reaction comprise olefin oligomers, i.e., low molecular weight polyolefins such as dimers, trimers, tetramers, etc., and olefin isomers, e.g., butene-2 from butene-1, branched olefins from 1-hexene, hexenes from propylene, etc.

My co-pending application, Ser. No. 373,878, filed June 9, 1964, discloses the use of higher valence rhenium compounds for the oxidation of olefins. During the oxidation reaction, the rhenium compound is reduced to a catalytically active rhenium oxide and a stoichiometric amount, i.e., the scission of a single carbon-hydrogen bond per unit change in valence of said rhenium oxide, of oxygenated product is produced, whereupon the reduced rhenium oxide must be regenerated in the presence of oxygen so that it can be used again for additional olefin oxidation. While the rhenium compound, thus reduced to a low oxidation state, is ineffective for oxidation of olefins, I have found that it is an effective catalyst for polymerization and rearrangement of olefins. In general, rhenium compounds that are reduced to an oxidation state ineffective to oxidize olefins are suitable condensation and rearrangement catalysts, e.g., rhenium dioxide, rhenium trioxide, rhenium sesquioxide.

Rhenium compounds suitable for use as a catalyst can be produced by oxidizing rhenium metal or by reducing higher valence rhenium oxides such as rhenium heptoxide and rhenium salts such as alkali metal, alkaline earth and ammonia perrhenates, e.g., sodium perrhenate, potassium perrhenate, calcium perrhenate, ammonia perrhenate, etc., by contacting said rhenium oxides and salts with olefins as disclosed in said co-pending application. The continued contacting with the olefin after oxidation of a stoichiometric quantity of the olefin results in the process of this invention, i.e., the rearrangement and oligomerization of the olefin. Suitable rhenium compounds can also be prepared by hydrolysis of rhenium halides such as rhenium trichloride, rhenium tetrachloride, rhenium hexachloride, rhenium tetrafluoride, rhenium hexafluoride, etc., and rhenium oxyhalides such as rhenium trioxybromide, rhenium oxytetrafluoride, rhenium trioxychloride, rhenium dioxydifluoride, etc.

Preferably, the hydrocarbon olefin is contacted with the rhenium oxides such as rhenium heptoxide under substantially anhydrous conditions. Water can be present; however, and, in particular, when using the other indicated rhenium compounds, water in amounts from about 1 to 50 weight percent and preferably from about 5 to 25 weight percent of the reaction medium can be used. Preferably such aqueous reaction medium is acidified with any suitable acid, e.g., a strong mineral acid such as nitric, sulfuric, or hydrochloric to lower the liquid pH to between about 1 to 6.5.

The rhenium catalyst can be used in the form of pellets or as a finely divided powder. When the olefins are introduced as a gaseous phase, the catalyst can be supported on a carrier having extended surfaces. Suitable carriers include any finely divided solid that is inert to the reaction and reactants and that, preferably, has a large specific surface area. Examples of suitable carriers include the difficulty reducible absorbent inorganic oxides; for example, silica-gel, alumina-gel, mixtures of silica and alumina, zirconia, titania, magnesia, beryllia, etc. Various natural clays may also be employed after suitable activation by heat and/or acid treatment. Such clays include, for example, the kaolin, attapulgite, montmorillonite clays such as bentonite, hectorite, etc. The zeolitic metalo alumino silicates commonly referred to as molecular sieves may also be used. These solids are crystalline composites of alumina and silica and have a uniform pore size from about 4.8 A. to about 13 A. units. Examples of naturally occurring zeolites are chabazite, gmelenite, acadialite, etc.

Olefins that can be rearranged or polymerized are branched or straight chain unsaturated acrylic olefins having one or more double bonds.. Low molecular weight olefins that are gaseous at ambient temperature and pressure such as ethylene, propylene, 1-butene, 2-butene, etc., can be used as well as olefins that are normally liquid such as n-pentene, 2-propylhexene-1, heptene, 4,4-dimethyl nonene-1, octene, 1-nonene, iso-decylene, dodacene, 1-tetradecene, 4-propyldecene-1, heptadecene, iso-octadecene, docosene, tetracosen, hexacosene, octacosene, triacontene, eicosene, etc. Preferably, the olefins should contain 2 to 30 carbon atoms and most preferably 2 to 20 carbon atoms. Relatively pure olefins can be used to simplify the product recovery steps; however, it is also within the scope of my invention to use mixtures of olefins.

When liquid phase conditions are employed, an organic liquid inert to the reaction and reactants can be used as the reaction medium. Preferably such organic liquid is a solvent for the normally gaseous olefins and the rhenium compound. In general, any organic compound that is a liquid and which is inert under the reaction conditions and chemically non-reactive with the olefin can be used and examples of suitable solvents are: aliphatic hydrocarbons such as hexane, heptane, iso-octane, nonane, decane, cyclohexane, methyl cyclohexane, etc.; halogenated hydrocarbons such as carbon tetrachloride, n-butyl bromide, iso-amylbromide, iso-amylchloride, trichloropropane, pentachloroethane, ethyl chloride, ethyl bromide, iso-butylchloride, etc.; esters such as methyl acetate, ethyl acetate, dimethyl phthalate, ethyl propionate, n-propyl acetate, n-butyl formate, sec-butyl acetate, iso-butyl acetate, ethyl butylrate, iso-amylacetate, cyclohexylacetate, etc.; and amide such as N,N-dimethylformamide, N,N-dimethyl acetamide, formamide, etc.

The temperature at which the rearrangement and oligomerization can be conducted is dependent upon the olefin charging stock employed. However, the reaction is generally carried out at a temperature of about 0° to about 300° C. and preferably at a temperature of about 25° to 150° C. Pressure aids the reaction if gaseous conditions are used. Generally pressures of about $10^{-2}$ to about $10^{+3}$ atmospheres are used with the preferred range being 1 to 100 atmospheres.

The process of this invention may be carried out in a discontinuous operation by heating olefins in the presence of a suitable rhenium oxide catalyst. After completion of the reaction, rearrangement and condensation products are recovered by conventional separation means such as distillation. It is preferred, however, to use a continuous process. This may be accomplished by passing olefins through a reaction zone containing a fixed bed of rhenium oxide catalyst maintained at reaction conditions. The resulting rearrangement and condensation products are recovered from the reactor effluent and any unreacted olefins may be recycled to the reaction zone.

A fluidized catalyst bed may also be employed in my invention. In this method of operation, olefins are passed upwardly through a bed of finely divided rhenium oxide catalyst causing the catalyst particles to become set in motion and form a fluid-like mass. Another mode of operation which may be employed is a moving catalyst bed which comprises continuously passing a compact bed of catalyst through an olefin reaction zone either concurrently or counter-currently to incoming olefins.

The following examples will illustrate the mode of practice of my invention and demonstrate the results obtainable thereby. All parts expressed herein are on a weight basis.

Example I

A 300 milliliter autoclave was charged with 50 parts 1-hexene and 2 parts of rhenium heptoxide. The rhenium heptoxide was reduced to an oxidation state ineffective to oxidize the 1-hexene by heating the olefin and rhenium oxide to 125° C. The heating was thereafter continued for 4 hours and the products of reaction were determined by gas-liquid chromatography to be a mixture of at least four isomeric hexenes and highly branched dodecenes.

Example II

A 300 milliliter autoclave was charged with 100 parts 1-octene and 1 part rhenium dioxide. The mixture was refluxed at a temperature of 125° C. for 10 hours. A complex mixture of highly branched octenes resulted.

Example III

A 300 milliliter autoclave was charged with 54 parts propylene, 50 parts n-heptane as a solvent and 2 parts rhenium dioxide. The mixture was heated to 100° C. for 4 hours at which time the products of reaction were determined by gas-liquid chromatography to be 4 parts of a mixture of hexenes, 2 parts of a mixture of nonenes, and 5 parts of a mixture of dodecenes and higher polymers.

Example IV

A 300 milliliter autoclave was charged with 50 parts 1-nonene and heated to 125° C. for 10 hours. No rearrangement or condensation products were obtained.

Example V

A 300 milliliter autoclave was charged with 54 parts propylene, 50 parts n-heptane as solvent and 2 parts rhenium heptoxide and heated to 100° C. for 4 hours. Then was isolated 4 parts of a mixture of hexenes, 2 parts of a mixture of nonenes and 5 parts of a mixture of dodecenes and higher polymers.

The preceding examples are intended solely to illustrate the practice of my invention and to demonstrate results secured thereby. These examples are not intended to unduly limit the invention which is intended to be defined only by the steps and reagents and their obvious equivalents, set forth in the following claims.

I claim:
1. A method for the rearrangement and oligomerization of olefins which comprises contacting, at a temperature of 0° to 300° C., a reactant consisting essentially of a hydrocarbon olefin having 2 to 30 carbon atoms with a catalytically active rhenium oxide reduced to an oxidation state ineffective to oxidize said olefin.
2. The method of claim 1 wherein the hydrocarbon olefin is propylene.
3. The method of claim 1 wherein the rhenium oxide is rhenium dioxide.
4. A method for the catalytic rearrangement and oligomerization of olefins which comprises contacting, at a temperature of 0° to 300° C., a reactant consisting essentially of a hydrocarbon olefin having 2 to 30 carbon atoms with rhenium heptoxide to produce a catalytically active rhenium oxide and incur oxidation of a stoichiometric amount of said olefin, and thereafter continuing said contacting of said olefin with said catalytically active rhenium oxide to effect their catalytic rearrangement and oligomerization.
5. The method of claim 4 wherein the hydrocarbon olefin is propylene.
6. A method for the catalytic rearrangement and oligomerization of olefins which comprises contacting, at a temperature of 0° to 300° C., a reactant consisting essentially of a hydrocarbon olefin having 2 to 30 carbon atoms in a liquid reaction medium which is inert under reaction conditions, with rhenium heptoxide to produce a catalytically active rhenium oxide and incur oxidation of a stoichiometric amount of said olefin, and thereafter continuing said contacting of said olefin with said catalytically active rhenium oxide to effect their catalytic rearrangement and oligomerization.
7. The method of claim 6 wherein the liquid reaction medium is hexane.
8. The method of claim 7 wherein the hydrocarbon olefin is propylene.
9. A method for the catalytic rearrangement and oligomerization of olefins which comprises contacting, at a temperature of 0° to 300° C., a reactant consisting essentially of a hydrocarbon olefin having 2 to 30 carbon atoms with water and a perrhenate selected from the group consisting of alkali metal, alkaline earth metal and ammonia perrhenates and mixtures thereof in a liquid reaction medium which is inert under reaction conditions to produce a catalytically active rhenium oxide and incur oxidation of a stoichiometric amount of said olefin, and thereafter continuing said contacting of said olefin with said catalytically active rhenium oxide to effect their catalytic rearrangement and oligomerization.
10. The method of claim 9 wherein the perrhenate is sodium perrhenate.
11. A method for the rearrangement and oligomerization of olefins which comprises contacting, at a temperature of 0° to 300° C. and out of the presence of oxygen, a reactant consisting essentially of a hydrocarbon olefin having 2 to 30 carbon atoms with catalytically active rhenium oxide reduced to an oxidation state ineffective to oxidize said olefin.

References Cited

UNITED STATES PATENTS

| | | | |
|---|---|---|---|
| 2,662,921 | 12/1953 | Middleton | 260—604 |
| 3,008,943 | 11/1961 | Guyer | 260—93.7 |

OTHER REFERENCES

Broadbent et al.: Jour. of Org. Chem., vol. 27 (1962), pp. 4400–4404.

Blom et al.: Industrial and Engineering Chem., vol. 54, No. 4 (April 1962), pp. 16–21.

Blom et al.: Hydrocarbon Processing and Petroleum Refiner, vol. 42, No. 10 (October 1963), pp. 132–134.

PAUL M. COUGHLAN, JR., *Primary Examiner.*